United States Patent [19]
Addison et al.

[11] Patent Number: 6,046,432
[45] Date of Patent: Apr. 4, 2000

[54] APPARATUS FOR WELDING LAMINATION STACK TO PRODUCE CORE OF ELECTROMECHANICAL MACHINE

[75] Inventors: Steven W. Addison, Athens; Jasper J. Brown, Jr., Bogart, both of Ga.

[73] Assignee: Reliance Electric Industrial Company, Milwaukee, Wis.

[21] Appl. No.: 08/971,533

[22] Filed: Nov. 17, 1997

[51] Int. Cl.[7] .............................. B23K 9/12; H02K 15/00; H01R 43/06

[52] U.S. Cl. ........................... 219/125.1; 29/596; 29/597; 29/598

[58] Field of Search ............................. 29/596, 597, 598; 219/125.1, 79

[56] References Cited

U.S. PATENT DOCUMENTS 4,523,076  6/1985  Laymon ................................ 219/125.1
5,658,477  8/1997  Kirker et al. ......................... 219/125.1

*Primary Examiner*—Patrick Ryan
*Assistant Examiner*—Anjan Dey
*Attorney, Agent, or Firm*—Craig N. Killen; John J. Horn; Alex M. Gerasimow

[57] ABSTRACT

An apparatus for producing magnetically-permeable cores for use in electromechanical machines, such as electric motors. The apparatus includes a plurality of welding arbors adapted to support a stack of core laminations. A storage structure defines a plurality of arbor storage locations at which respective welding arbors are maintained. A transporter device is operative to individually move the welding arbors to and from a respective arbor storage location. A welding device is operative to weld the stack of core laminations together. A conveyor assembly is also provided for moving the welding arbors between the welding device and the transporter device.

23 Claims, 14 Drawing Sheets

APPARATUS FOR WELDING LAMINATION STACK TO PRODUCE CORE OF ELECTROMECHANICAL MACHINE

BACKGROUND OF THE INVENTION

The present invention relates generally to the manufacture of electromechanical machines, such as electric motors. More particularly, the invention relates to an improved apparatus for welding lamination stacks to produce a magnetically-permeable core for use in an electromechanical machine.

Electric motors and other electromechanical machines are generally constructed having at least one magnetically-permeable core. For example, induction motors are typically constructed having a cylindrical stator core. The inner circumference of the stator core defines a plurality of parallel slots in which electrical windings are maintained. As is well known, current flow through the windings produces a rotating magnetic field which the rotor of the machine will tend to follow.

To manufacture the core, a relatively large number of laminations may be stacked on a welding arbor to a desired height. Often, the welding arbor is configured to radially expand against the inner circumference of the stack such that the individual laminations will be concentrically aligned. A welding device is utilized to produce a plurality of vertical welds at predetermined angular locations on the outer circumference of the stack. As a result, the laminations will be connected together into a core body that can be handled as a unit.

The dimensions of the core will vary depending on the particular motor into which it is to be installed. For example, parameters such as outer diameter, inner diameter and winding slot spacing are dictated by specific motor criteria. Typically, a different welding arbor will be required for each of the various core configurations.

In the past, systems have been employed in order to permit the use of different welding arbors with a single welding machine. It has been generally difficult with these systems to store and retrieve the different arbors without delays in the manufacturing process. For example, one known system uses a horizontal storage system which requires rotating through multiple arbors in order to retrieve a particular arbor that has been selected. In addition, it has often been necessary to set-up the welding system each time a different core was to be produced.

SUMMARY OF THE INVENTION

The present invention recognizes and addresses the foregoing disadvantages, and others, of prior art constructions and methods. Accordingly, it is an object of the present invention to provide an improved apparatus for use in producing a magnetically permeable core from a plurality of stacked laminations.

It is also an object of the present invention to provide an improved apparatus for welding a lamination stack utilizing a minimum area of floor space in comparison with prior art systems used for similar purposes.

It is a particular object of the present invention to provide an improved apparatus for welding a lamination stack which permits rapid changeover to different core styles.

It is also an object of the present invention to provide welder apparatus for a lamination stack having various improved operative functions.

Some of these objects are achieved by an apparatus for welding electromechanical machine cores. The apparatus comprises a plurality of welding arbors each adapted to support a stack of core laminations. A storage structure defines a plurality of arbor storage locations at which respective of the welding arbors are maintained. A transporter device is operative to individually move the welding arbors to and from a respective arbor storage location.

The apparatus further includes a welding device operative to weld the stack of core laminations together. A conveyor assembly is provided for moving the welding arbors between the welding device and the transporter device. The conveyor assembly is preferably configured as a loop about which the welding arbors travel.

In presently preferred embodiments, the storage structure is configured as a vertical rack with a predetermined number of arbor storage locations being situated in vertical orientation. The transporter device in such embodiments is preferably operative to move the respective welding arbors only between a particular arbor storage location and the conveyor assembly.

Each of the welding arbors is preferably configured having a machine readable indicia. For example, the machine readable indicia may be configured as at least one slot defined on a base plate of the welding arbor.

Often, the welding arbors will be radially expandable to concentrically align the lamination stack. In such embodiments, a loading station of the conveyor assembly will preferably include a mechanism to effect this expansion. Preferably, the welding device may also include a mechanism to effect expansion of the welding arbor.

The welding device preferably comprises a ram mechanism to engage the lamination stack during welding thereof. In some presently preferred embodiments, the ram mechanism will be operative to apply a first higher compression pressure and a second lower welding pressure against the lamination stack. The welding device is preferably equipped with at least one welding head driven by a servo-controlled mechanism to effect at least one axial weld along the lamination stack.

In some presently preferred embodiments, the welding head will be operative to angularly index about the lamination stack to produce welds at a plurality of angular locations. At least three such welding heads may be provided to produce axial welds in multiples of three.

Other objects of the invention are achieved by an apparatus for welding a lamination stack located on a support structure. The apparatus comprises a ram mechanism to engage the lamination stack during welding thereof. The ram mechanism is operative to apply a first higher compression pressure and a second lower welding pressure against said lamination stack. At least one welding head is driven, such as by a servo-controlled mechanism, to effect at least one axial weld along the lamination stack.

In some presently preferred embodiments, the welding head is further operative to angularly index about the lamination stack to produce axial welds at a plurality of angular locations. Often, at least three such welding heads will be provided.

Additional objects of the invention are achieved by alternative apparatus for welding a lamination stack located on a support structure. The apparatus comprises a ram mechanism to engage the lamination stack during welding thereof. At least one welding head is also provided, driven to effect an axial weld along the lamination stack. The welding head is further operative to angularly index about the lamination stack to produce a plurality of welds at respective angular locations.

Still further objects of the invention are achieved by an apparatus for assembling a stack of laminations into an electromechanical machine core. The apparatus comprises a plurality of arbors each adapted to support a stack of core laminations. A storage structure defines a plurality of arbor storage locations at which respective of the arbors are maintained. The storage structure is configured as a vertical rack with a predetermined number of the arbor storage locations being situated one above another.

The apparatus further includes a transporter device operative to individually move the arbors to and from a respective arbor storage location. A core assembly device, such as a welding device, operatively connects the stack of core laminations together. A conveyor assembly is also provided for moving the arbors between the core assembly device and the transporter device.

Other objects and aspects of the present invention are provided by various combinations and subcombinations of the disclosed elements, which are discussed in greater detail below.

BRIEF DESCRIPTION OF THE DRAWINGS

A full and enabling disclosure of the present invention, including the best mode thereof, to one skilled in the art, is set forth more particularly in the remainder of the specification, including reference to the accompanying drawings, in which.

Figure 1:
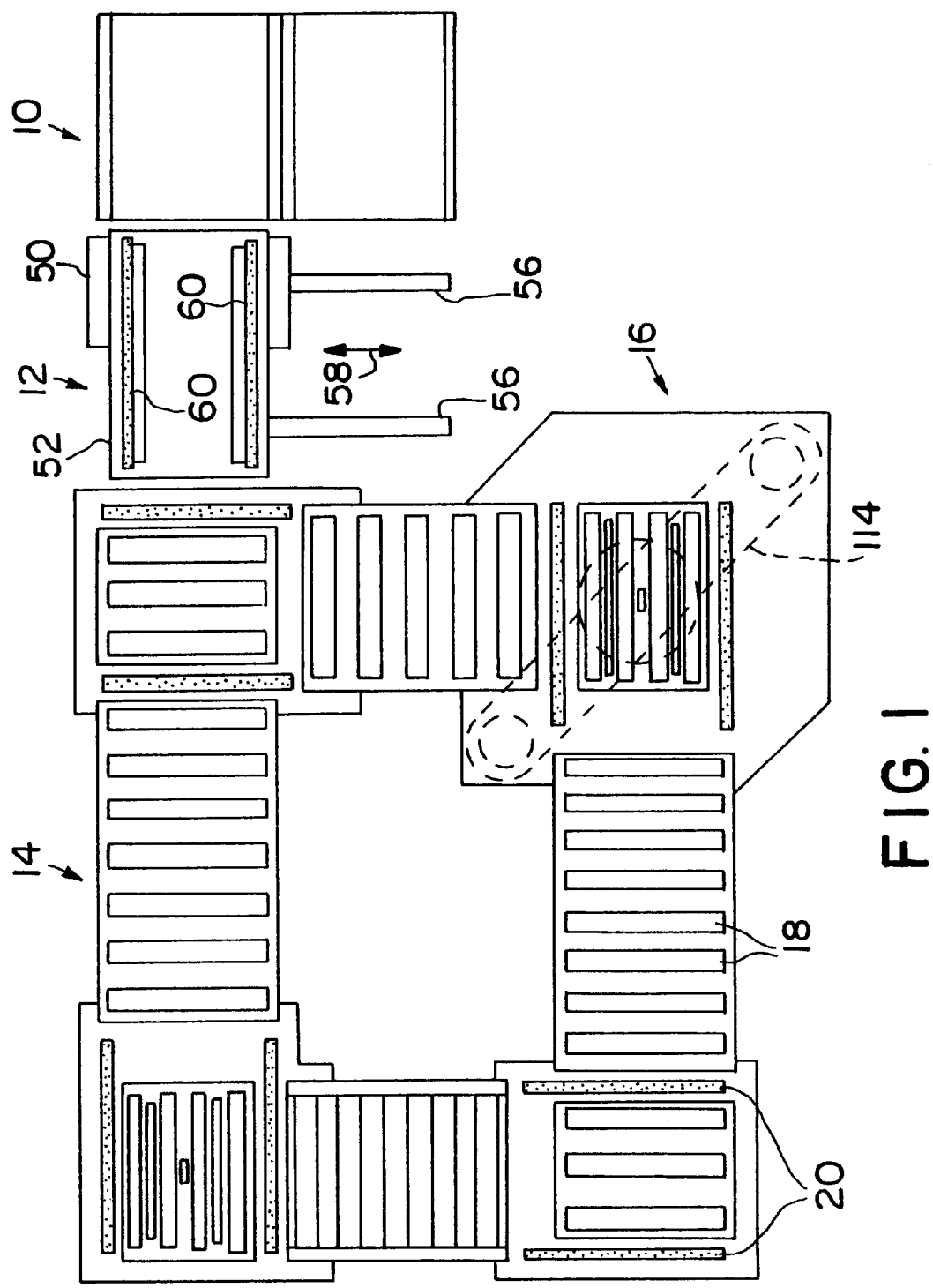
FIG. 1 is a floor plan view of a welding apparatus constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 is a floor plan representation of an improved welding apparatus of the present invention. Generally, the apparatus includes a storage structure 10 for maintaining a plurality of welding arbors. A transporter 12 is provided to move the respective arbors to and from selected storage locations within storage structure 10. A conveyor assembly 14 functions to move the arbors to and from a welding device 16. At welding device 16, individual laminations stacked on the welding arbor are welded together into a core.

Conveyor assembly 14 is arranged as a continuous loop about which multiple welding arbors are advanced. In the illustrated embodiment, the welding arbors are moved along longitudinal sections of conveyor assembly 14 by driven rollers, such as rollers 18. As will be apparent from the discussion below, the arbors are moved out of corner locations using parallel conveyor chains, such as chains 20.

Figure 2:
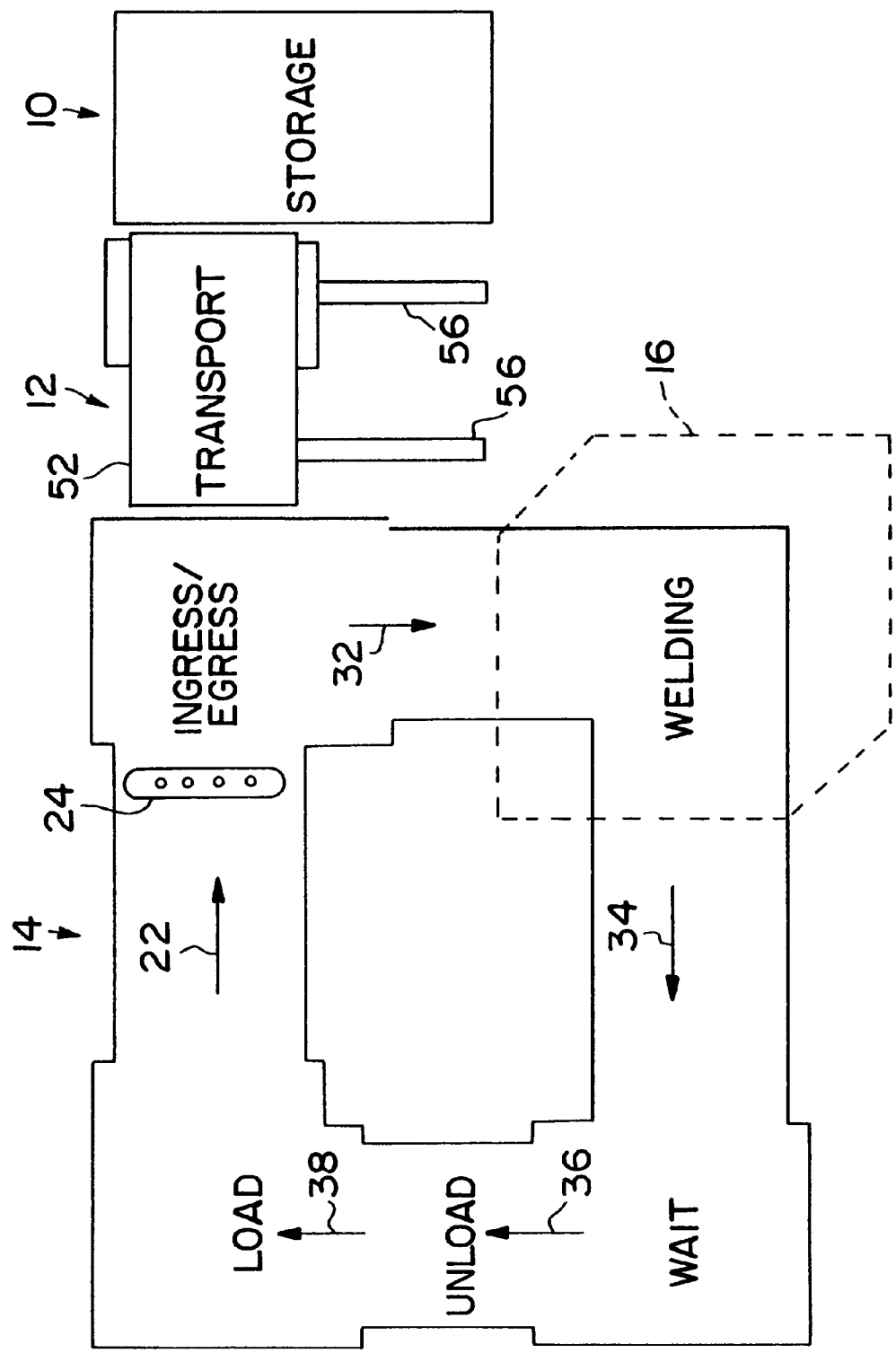
FIG. 2 is a schematic floor plan of the apparatus of FIG. 1.

Referring now also to FIG. 2, the lamination stack to be welded "begins" at the load station, where an operator stacks laminations on a selected welding arbor to a predetermined height. The loaded arbor proceeds along, as indicated by arrow 22, to the ingress/egress station, located adjacent transporter 12.

Between the load station and the ingress/egress station, the arbor passes a fixed sensor array 24. Sensor array 24 operates to detect machine readable indicia located on the passing arbor. This indicia is used by the system PLC, or other electronic control means, to identify the particular arbor. In presently preferred embodiments, the apparatus can accept and weld multiple arbors (e.g., one to three) moving about the loop at one time. Because each arbor is identified prior to welding, the apparatus can responsively adjust welding parameters and the like. Each of the multiple arbors can thus contain the same or a different core product from the other arbors. This is particularly advantageous if the apparatus will be fed laminations from more than one lamination forming machine.

Figure 2A:
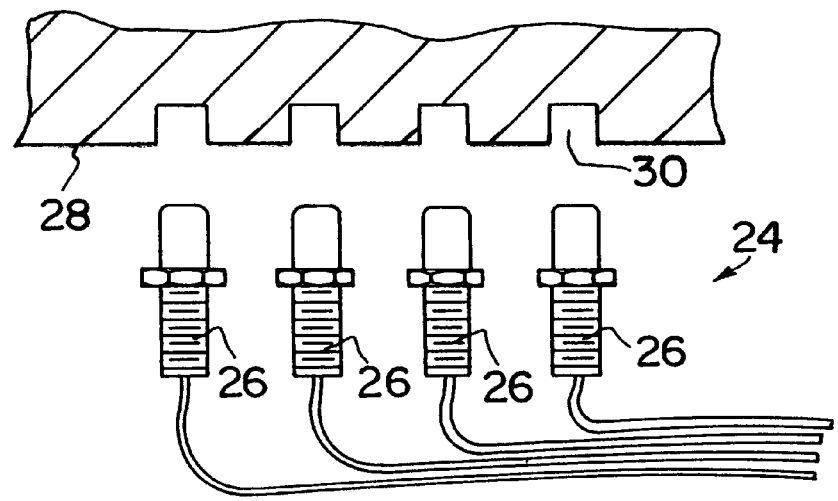
FIG. 2A is an enlarged view of a sensor array that may be utilized to detect machine readable indicia located on the welding arbors.

In presently preferred embodiments, sensor array 24 may comprise a plurality of proximity sensors. For example, FIG. 2A illustrates a series of proximity sensors 26 mounted under the arbor travel path. The base plate 28 of each such arbor may define one or more slots, such as slot 30, which may be detected by proximity sensors 26. The number and relative location of the slots on a particular arbor gives the indicia that can be interpreted by the control means as described above.

Referring again to FIG. 2, a loaded arbor will turn at the ingress/egress station and proceed to the welding station, as indicated by arrow 32. After the laminations have been welded together, the arbor is moved out of the welding device 16. As will be appreciated by one skilled in the art, the welding operation will preferably occur inside of a suitable enclosure. After the welding operation is completed, the arbor will proceed to the wait station, as indicated by arrow 34.

The apparatus is configured so that an arbor will remain at the wait station if another arbor is located at the unload station downstream. If the unload station is vacant, the arbor will proceed as indicated by arrow 36 to the unload station.

The operator removes the welded core at the unload station, and the arbor proceeds to the load station as indicated by arrow 38. The unloaded arbor is thus freed up to accept another lamination stack, or to return to storage so that another arbor size can be placed in the sequence.

Figure 3:
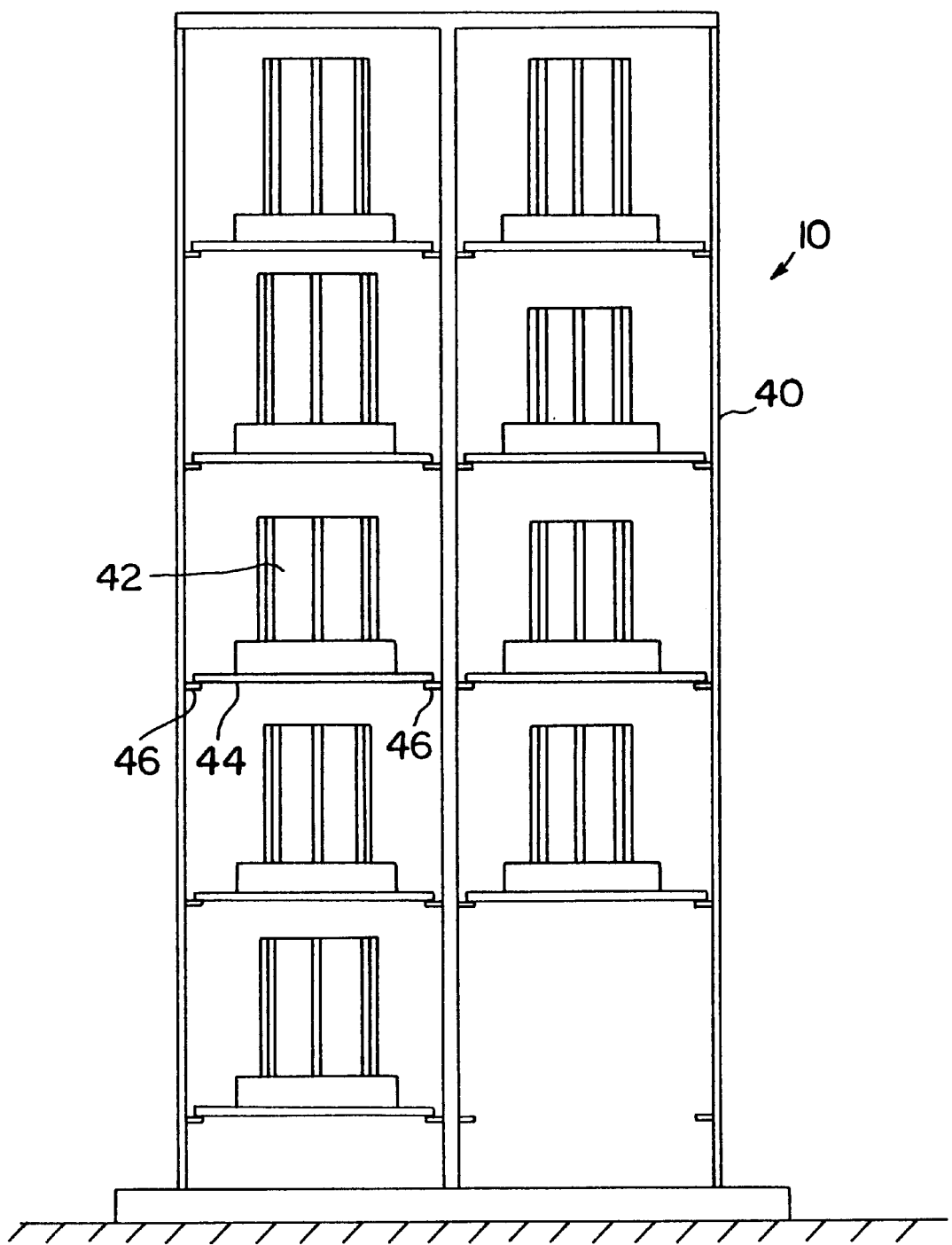
FIG. 3 is a front elevational view of the arbor storage structure utilized in the apparatus of FIG. 1.

As shown in FIG. 3, storage structure 10 is preferably constructed as a vertical rack 40 in which a plurality of arbor storage locations are arranged in side-by-side columns. Each such location stores a particular arbor for use in producing a specific core configuration. The control means of the apparatus "knows" which arbor is stored in a given storage location so that it may be easily retrieved or returned as desired.

As an example, reference is made to the storage location of rack 40 in which arbor 42 is contained. It can be seen that base plate 44 of arbor 42 rests on opposing shelf members 46. The portion of base plate 44 between shelf members 46 is thus exposed to be acted upon by transporter 12, as will be explained below.

Figure 4:
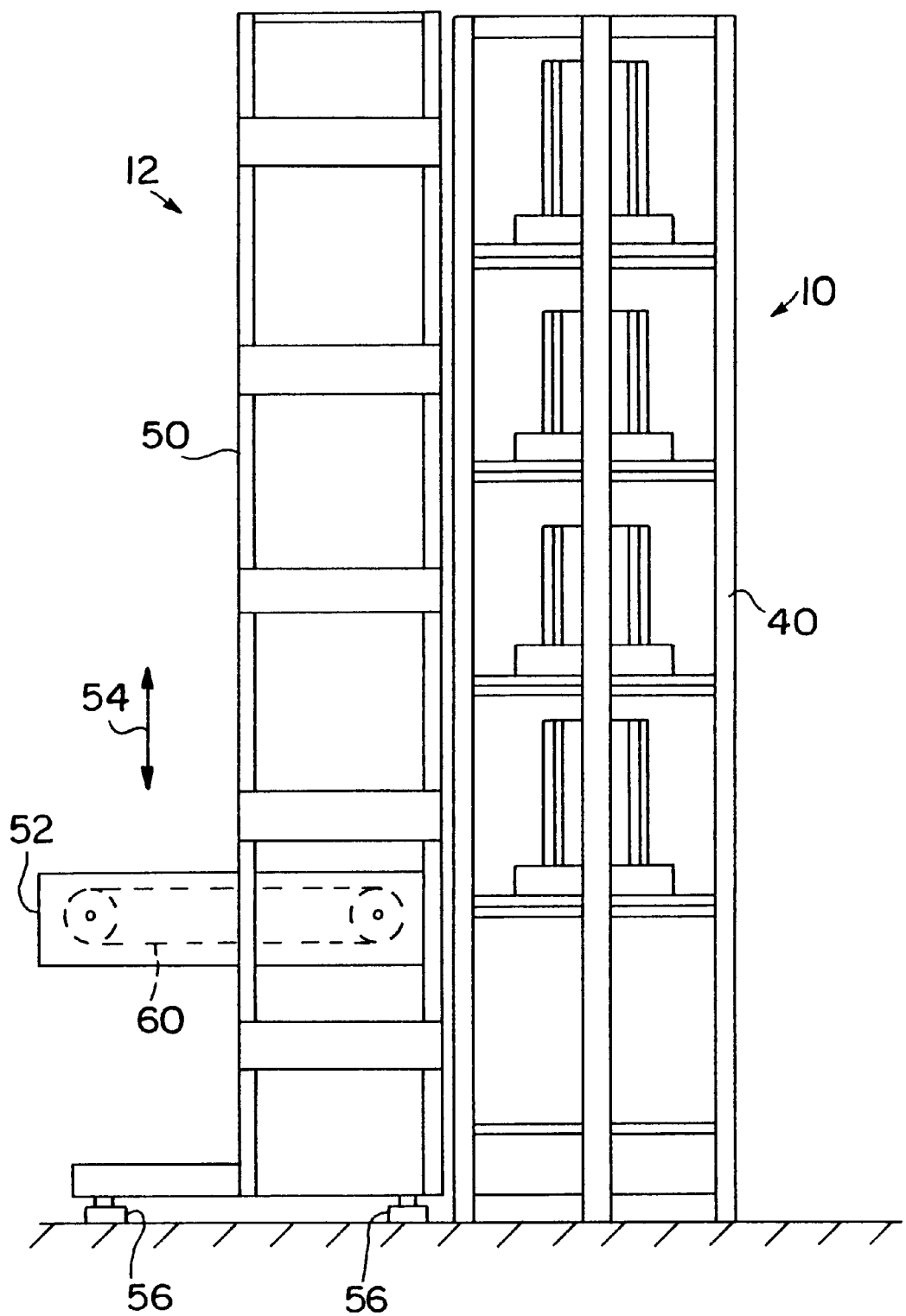
FIG. 4 is a side elevational view of the arbor storage structure utilized in the apparatus of FIG. 1, further showing the transporter device located adjacent thereto.

Referring now to FIG. 4, transporter 12 includes a vertical guideway 50 having a height approximately equal to the height of rack 40. A carriage 52 is mounted for vertical movement within guideway 50, as shown by arrow 54. Guideway 50 itself moves laterally across the front of rack 40 along fixed parallel tracks 56 (as indicated by arrow 58 of FIG. 1). Carriage 52 can thus be moved to a location directly adjacent any of the arbor storage locations within rack 40.

Figure 5A:
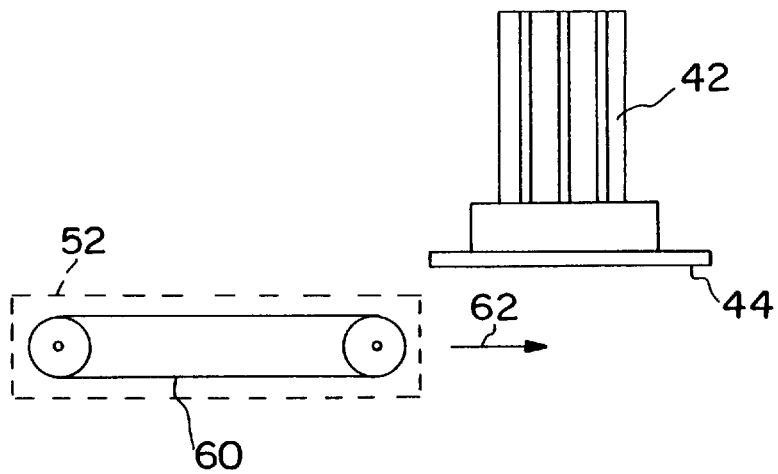
FIGS. 5A through 5C diagrammatically illustrate various operations by which the transporter device retrieves a selected welding arbor.
Figure 5B:
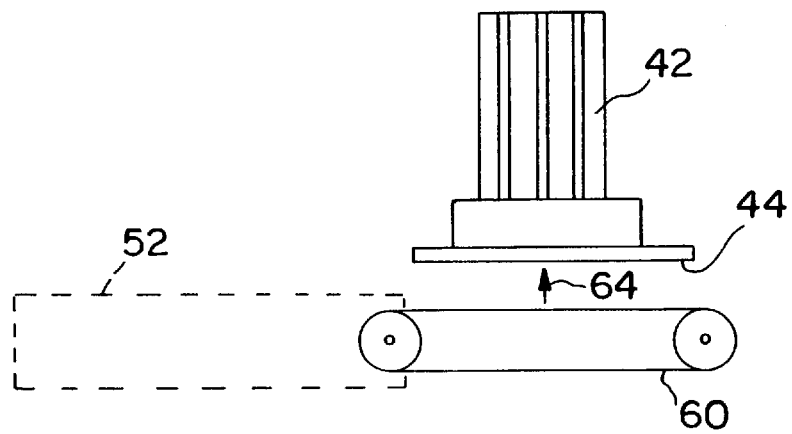
Figure 5C:
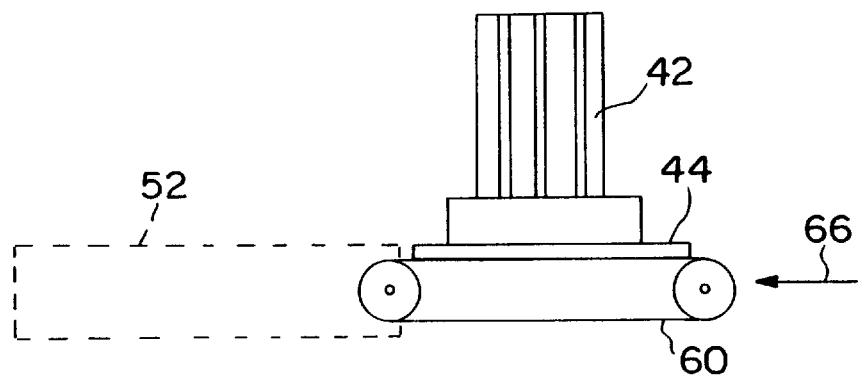

As can be most easily seen in FIG. 1, carriage 52 includes a pair of parallel conveyor chains 60 mounted for extensible movement toward rack 40. Thus, as indicated by arrow 62 of FIG. 5A, chains 60 can be moved to a location under a selected arbor 42. As shown in FIG. 5B, chains 60 may initially be located slightly below arbor 42. Then, as indicated by arrow 64, chains 60 are raised into engagement with base plate 44. Chains 60, now carrying arbor 42, are then retracted back into the main body of carriage 52. This is indicated by arrow 66 of FIG. 5C.

Referring again to FIGS. 1 and 2, carriage 52 is next fully lowered and aligned with the ingress/egress station of conveyor assembly 14. Chains 60 may then be activated to deliver arbor 42 to conveyor assembly 14. In a preferred embodiment, arbor 42 is first moved opposite the direction of arrow 22 so that sensor array 24 can read the machine readable indicia thereon. The reverse movement of arbor 42 is then stopped, and arbor 42 proceeds back around conveyor assembly 14 in the conventional direction to the loading station. Welding device 16 is equipped with sensors to detect the absence of a lamination stack on arbor 42. As such, an unloaded arbor will not initiate a welding operation.

Arbor return may be initiated by the operator when an empty arbor is situated at the loading station of conveyor assembly 14. When this occurs, the empty arbor continues through the ingress/egress station onto conveyor chains 60 of carriage 52. Transporter 12 then operates essentially in an order reverse to that described above to place the arbor in its assigned storage location.

FIGS. 6A through 6D illustrate operation of conveyor assembly 14 at the loading station. In presently preferred embodiments, each arbor will include a radially expanding mechanism to concentrically align the individual laminations of the stack. Toward this end, a draw bar 66 interlocks with the radially expanding mechanism of each arbor at the loading station. Movement of draw bar 66, as controlled by the operator, causes expansion of the arbor.

Figure 6A:
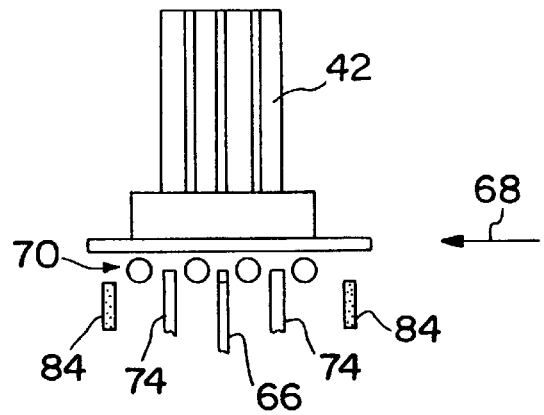
FIGS. 6A through 6D diagrammatically illustrate various operations at the loading station of the apparatus of FIG. 1.
Figure 6B:
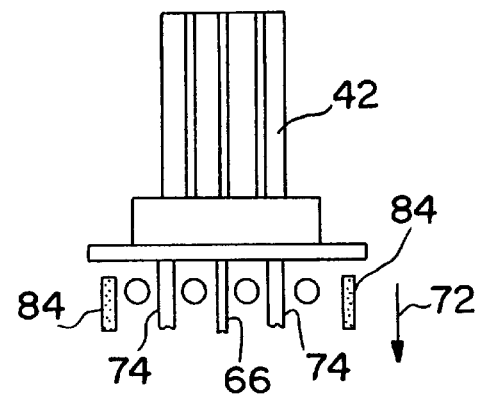

As indicated by arrow 68 of FIG. 6A, arbor 42 moves into the loading station due to the rotation of drive rollers 70. At this time, draw bar 66 remains retracted to a location below the base plate of arbor 42. Drive rollers 70 then drop as a unit, as indicated by arrow 72 of FIG. 6B, to rest arbor 42 on fixed supports 74. It can be seen that draw bar 66 has now been moved into interlocking relationship with the expanding mechanism of arbor 42.

Figure 6C:
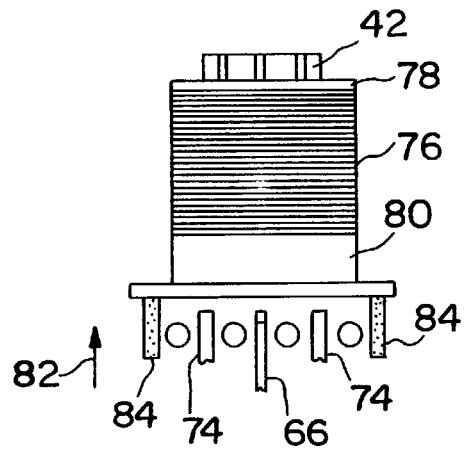
Figure 6D:
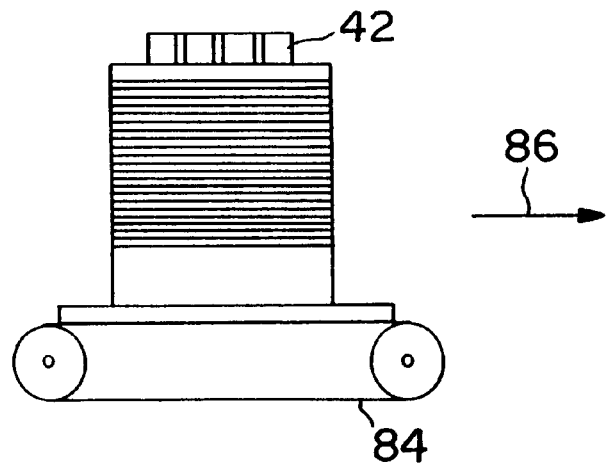

As shown in FIG. 6C, a plurality of laminations are then placed on arbor 42 to a predetermined vertical height. Preferably, draw bar 66 will be activated frequently by the operator to concentrically align the individual laminations as the lamination stack 76 is being built up. A top plate 78 is then placed above the stack 76, as shown. Top plate 78 and bottom plate 80 preferably include copper inserts at the locations where welds will be made to prevent the core from welding to the arbor itself.

After the lamination stack is loaded, the operator can initiate movement of arbor 42 out of the loading station. Toward this end, draw bar 66 will release from its interlock with the expanding mechanism of arbor 42. Next, as indicated by arrow 82 of FIG. 6C, parallel conveyor chains 84 are raised to lift arbor 42 from fixed supports 74. Operation of conveyor chains 84, as indicated by arrow 86 of FIG. 6D, causes arbor 42 to move out of the loading station.

A similar arrangement of drive rollers and drive chains can be used at the other "corner" stations of conveyor assembly 14. In addition, like the loading station, the welding station preferably includes fixed supports on which the arbor is placed during the welding operation. The welding station will also preferably include a draw bar arrangement, which in this case automatically actuates the radially expanding mechanism of the arbor.

Figure 7:
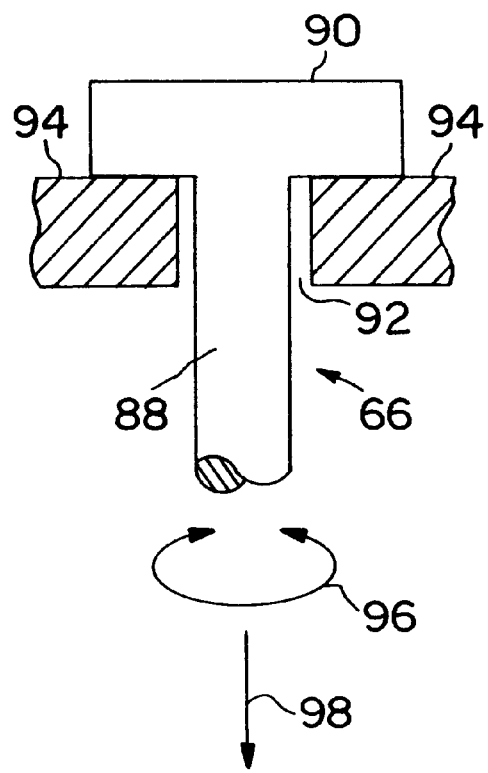
FIG. 7 is an enlarged view showing operation of a draw bar mechanism for effecting radial expansion of the welding arbor.

FIG. 7 illustrates specific details of the manner in which draw bar 66 engages the radially expanding mechanism of the welding arbor. Draw bar 66 is T-shaped in the illustrated embodiment, having an elongate shaft portion 88 and a head portion 90. When rotated perpendicular to the position shown, head portion 90 can be inserted through a slot 92 defined in a follower body 94 located in a bore (not shown) defined in the base plate of the arbor.

After being inserted, head 90 is rotated into the interlock position as shown by arrow 96. Downward movement of draw bar 66, as shown by arrow 98, causes a concomitant downward motion of follower body 94. A linkage connected to follower body 94 causes outward radial movement of expansion blades 100 (FIG. 11) against the inner circumferential surface of lamination stack 76.

Figure 8A:
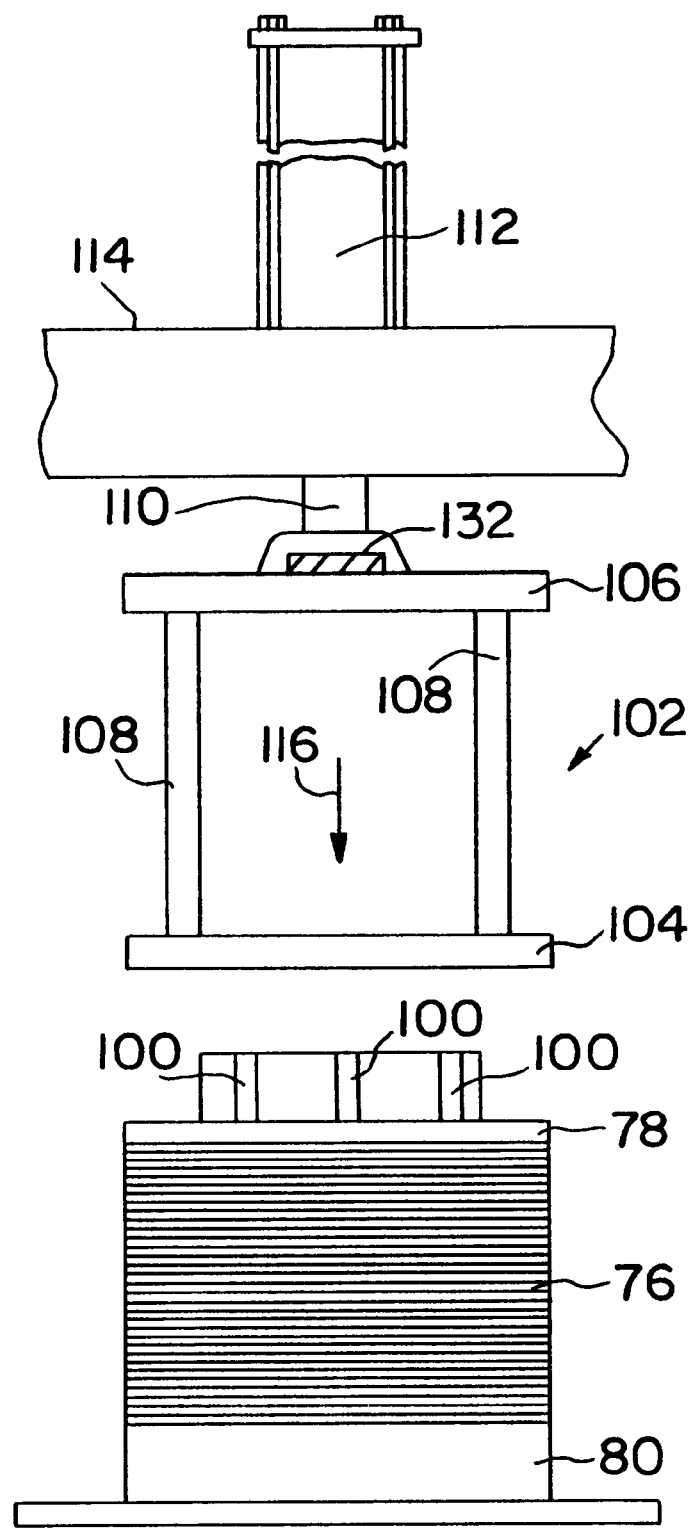
FIG. 8A illustrates the compression ram at the welding device of the apparatus of FIG. 1 in a retracted position.
Figure 8B:
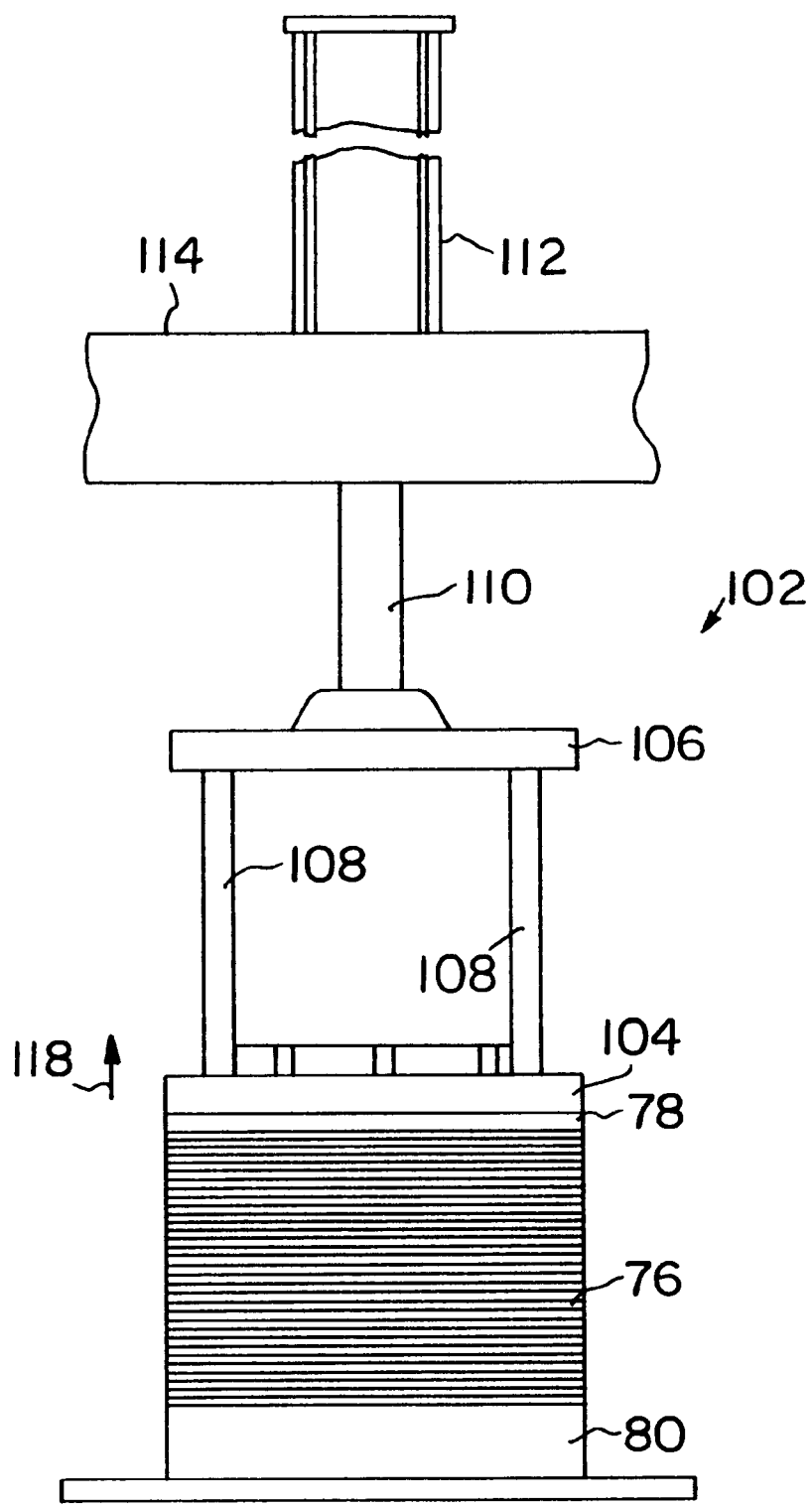
FIG. 8B illustrates the compression ram at the welding device of the apparatus of FIG. 1 in an engaged position.

In FIGS. 8A and 8B, arbor 42 has traveled to the welding station of conveyor assembly 14. At this location, a ram mechanism 102 of welding device 16 engages lamination stack 76. Ram mechanism 102 includes an annular engaging ring 104 interconnected with an upper plate 106 via supports 108. Upper plate 106 is attached to one end of a piston rod 110 extending from a fluid-actuated cylinder 112. Cylinder 112 is itself mounted to a fixed cross beam 114.

Actuation of cylinder 112 causes engaging ring 104 to move downward (as indicated by arrow 116 of FIG. 8A) into contact with top plate 78. Initially, ram mechanism 102 applies a higher compression pressure to lamination stack 76. This higher initial pressure is desirable to yield parallel laminations. Ram mechanism 102 then backs off of the higher compression pressure (as shown by arrow 118 of FIG. 8B) to a lower welding pressure maintained during the welding operation. The lower welding pressure is desirable to lessen stresses at the weld joints and to facilitate independent magnetic action of the individual laminations in the finished core. The particular pressures may be programmed for each of the different product arbor types to yield the optimum stator core product.

Figure 9:
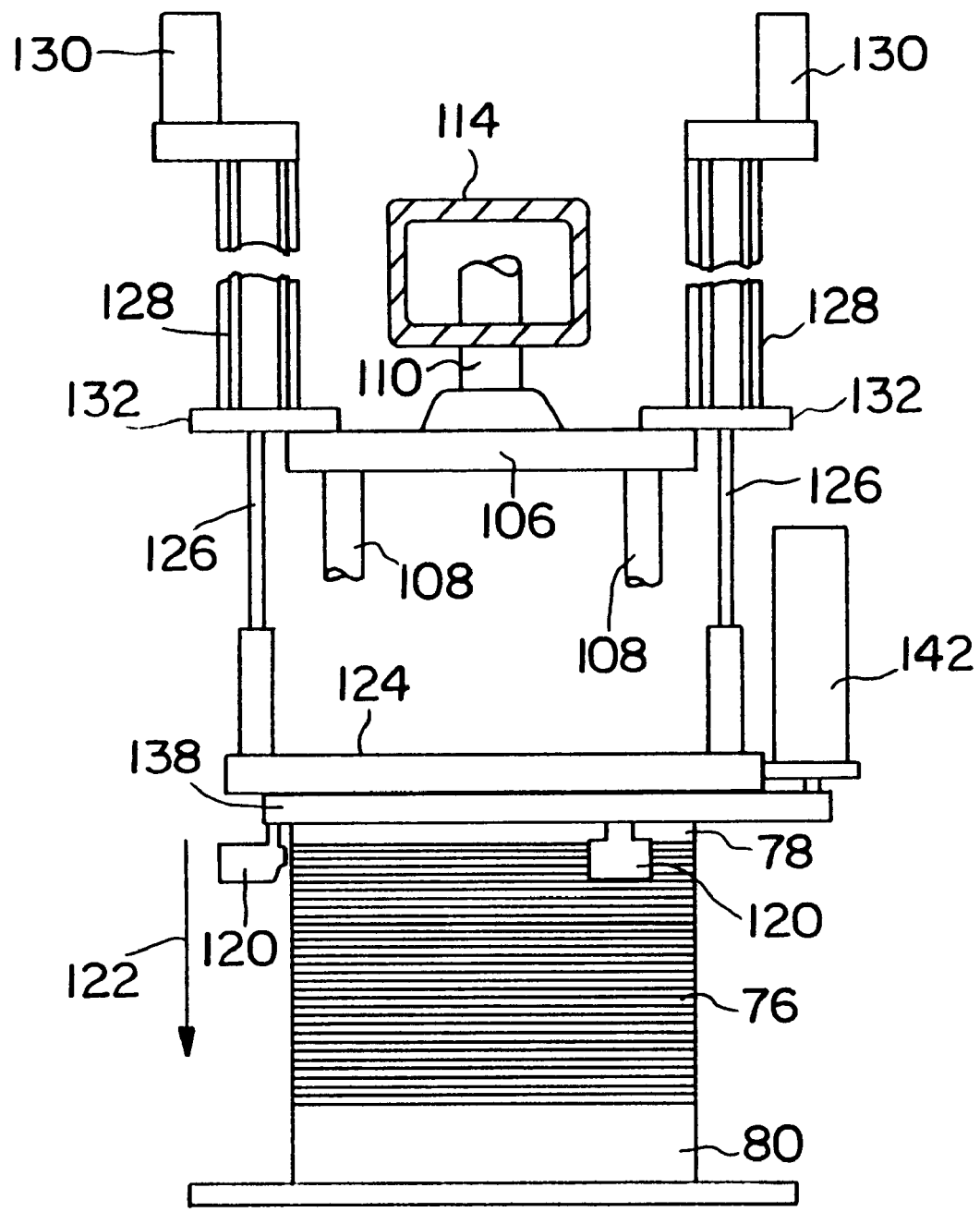
FIG. 9 illustrates the welding head arrangement at the welding device of the apparatus of FIG. 1.

Referring now to FIG. 9, the welding device preferably utilizes a plurality of welding heads 120 of the TIG variety or other suitable type. Welding heads 120 are movable in a vertical direction (as indicated by arrow 122) to form respective vertical welds along the outer circumference of lamination stack 76. For example, many embodiments will employ three welding heads to yield three welds with each vertical pass. The welding heads may then be indexed by a predetermined angular extent to permit three more simultaneous welds to be produced. In presently preferred embodiments, at least six vertical welds, and often as many as twelve, will be formed on the lamination stack in this manner.

The welding heads 120 are carried by a support plate 124 defining a hole larger than the outer circumference of lamination stack 76. Preferably, support plate 124 is precisely controlled in its stroke and rate of descent by a suitable servo mechanism. Toward this end, support plate 124 may be connected to shafts 126 of respective ball screws 128. Ball screws 128 are individually driven by respective servo motors 130 mounted thereon. Ball screws 128 are themselves mounted on rigid shelves 132 extending from upper plate 106.

Figure 10:
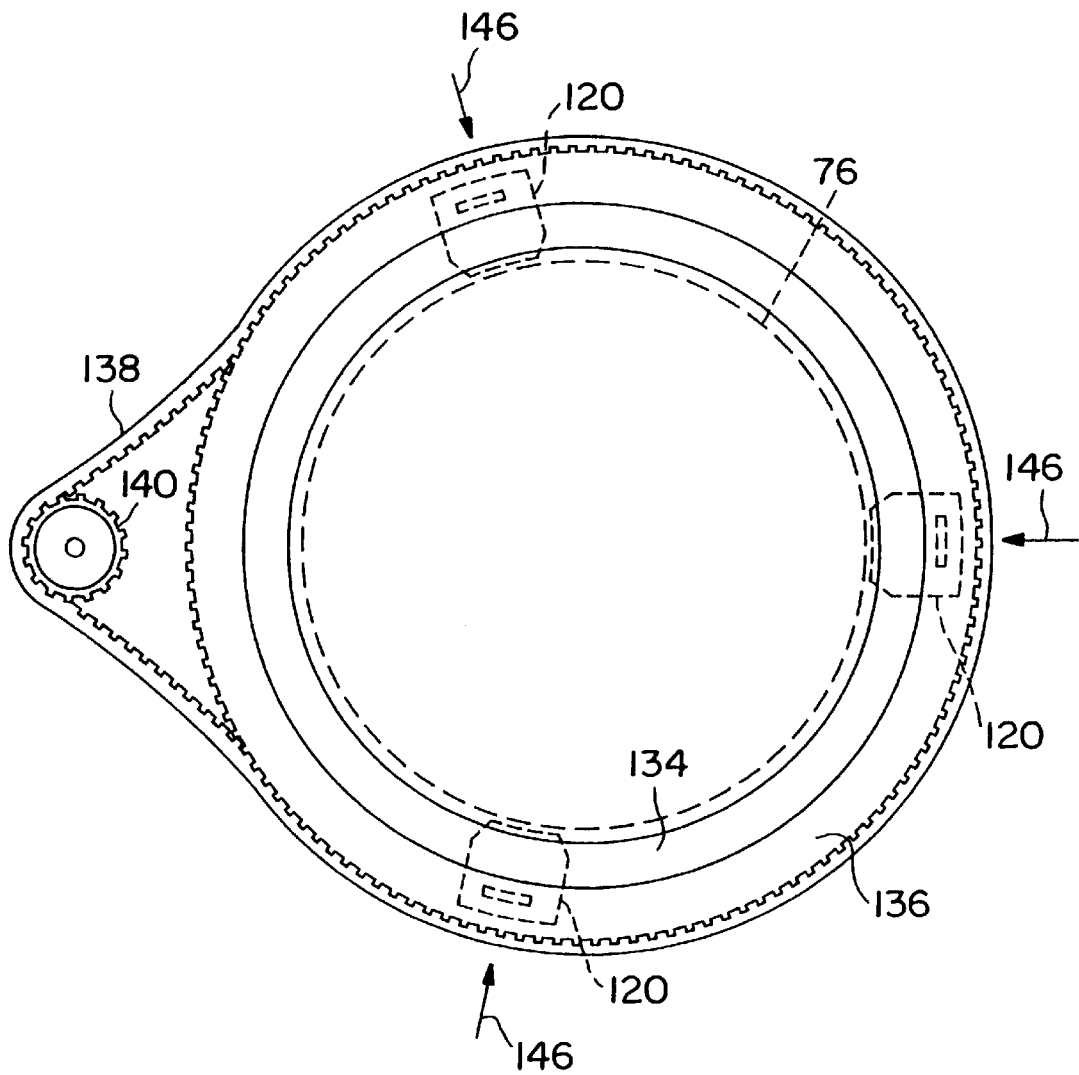
FIG. 10 is a plan view showing the servo mechanism for effecting angular indexing of the welding heads of FIG. 9.
Figure 11:
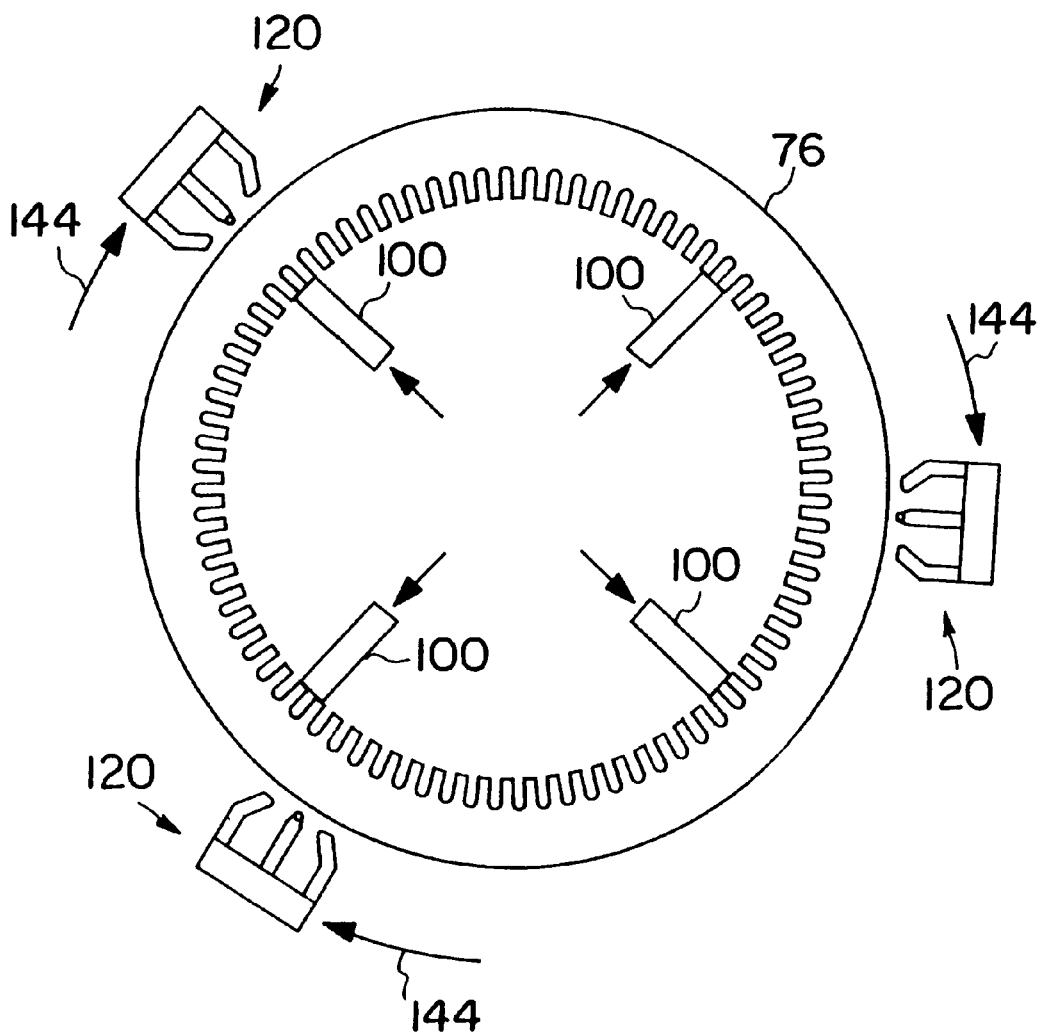
FIG. 11 diagrammatically illustrates angular indexing of the welding heads about the lamination stack through operation of the mechanism of FIG. 10.

Referring now also to FIGS. 10 and 11, the indexing mechanism of the welding device can be most easily explained. In the illustrated embodiment, the mechanism comprises an inner ring 134 fixed with respect to support plate 124. An outer ring 136, defining a gear on its outer circumference, is rotatably supported by inner ring 134. The respective welding heads 120 are mounted to outer ring 136 for rotation therewith.

A toothed belt 138 extends about the outer ring 136 to cause indexing of welding heads 120 when desired. Belt 138 is driven by a servo gear 140 connected to the shaft of servo motor 142 (which is fixedly mounted on support shelf 124). The indexing motion of welding heads 120 is indicated in FIG. 11 by the arrows 144.

Prior to the welding operation, welding heads 120 will be retracted to a radially outward position as support plate 124 as lowered into position. When support plate 124 is in the correct starting position, however, welding heads 120 are moved radially inward into light engagement with the outer circumference of lamination stack 76 (as indicated by arrows 146 of FIG. 10).

Figure 12:
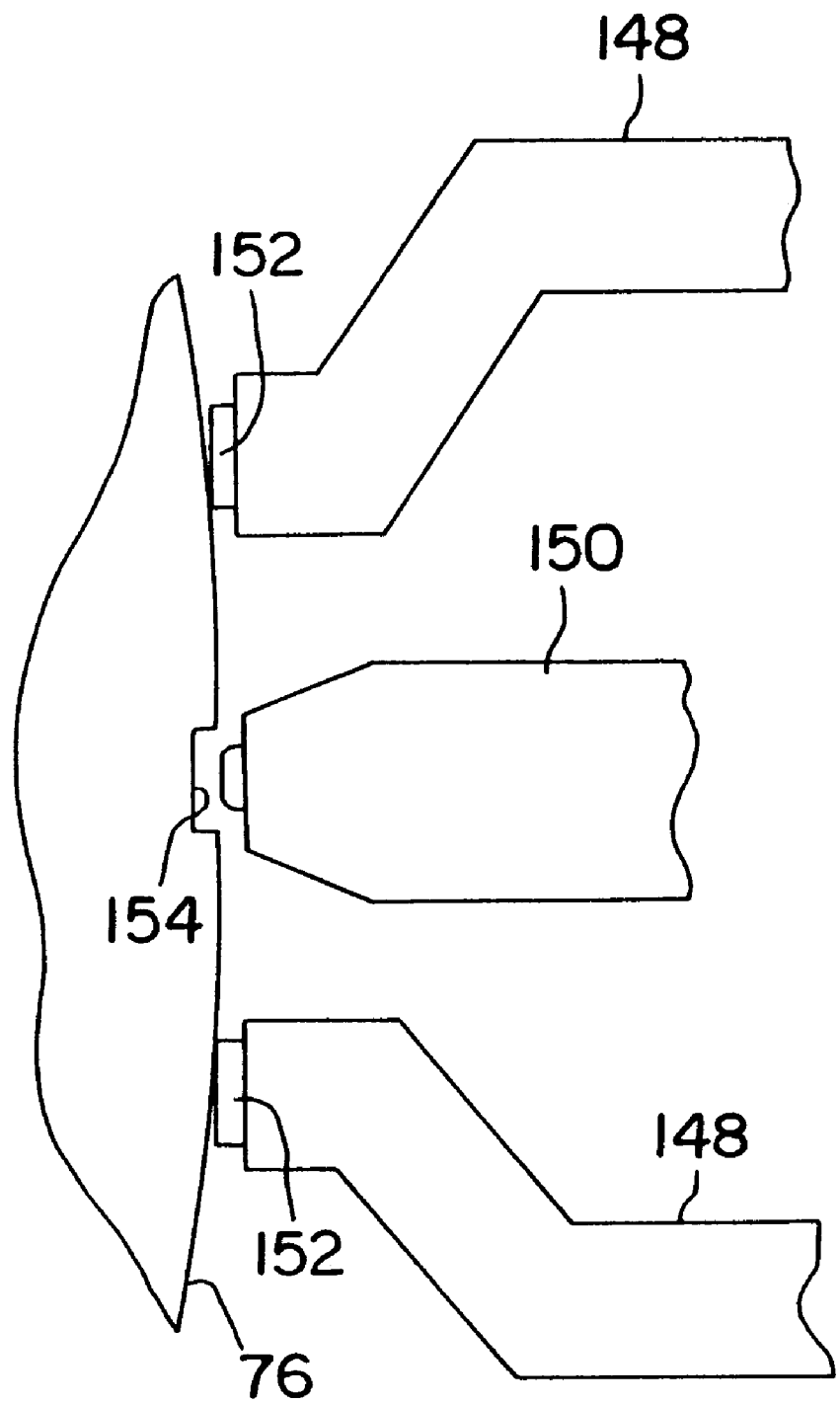
FIG. 12 is an enlarged view of a preferred welding head electrode structure in proximity to the outer circumference of the lamination stack.

As shown in the fragmentary view of FIG. 12, each welding head 120 preferably includes a pair of positioning fingers 148 on either side of welding electrode 150. As a result, electrode 150 will be situated adjacent the outer surface of lamination stack 76 without direct contact. Positioning fingers 148 are preferably equipped with rollers 152 to reduce friction as the welding head is moved vertically down the lamination stack. FIG. 12 also clearly shows one of the vertical weld slots 154 defined in the lamination stack along which the welds are preferably formed.

Figure 13:
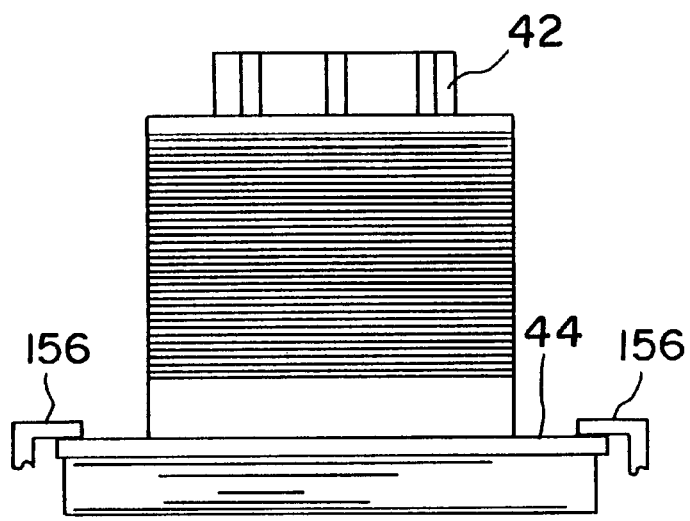
FIG. 13 is an elevational view of a welding arbor at the unloading station of the apparatus of FIG. 1.

The core produced by welding of the lamination stack is removed at the unloading station of conveyor assembly 14. FIG. 13 illustrates arbor 42 at this location, where it can be seen that retaining flanges 156 extend over a portion of base plate 44. Retaining flanges 156 hold the arbor down so that the operator can more easily lift the core from about the arbor spindle.

It can be seen that the present invention provides an improved apparatus for welding a lamination stack for producing a magnetically-permeable core. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. Apparatus for welding electromechanical machine cores, comprising:

a plurality of welding arbors adapted to support a stack of core laminations;

a storage structure defining a plurality of arbor storage locations at which respective of said welding arbors are maintained;

a transporter device operative to individually move said welding arbors to and from a respective of said arbor storage locations;

a welding device operative to weld the stack of core laminations together; and a conveyor assembly for moving said welding arbors between said welding device and said transporter device.

2. Apparatus for welding electromechanical machine cores as set forth in claim 1, wherein said storage structure is configured as a vertical rack with a predetermined number of said arbor storage locations being situated in vertical orientation.

3. Apparatus for welding electromechanical machine cores as set forth in claim 2, wherein said transporter device is operative to move a respective of said welding arbors only between a particular arbor storage location and said conveyor assembly.

4. Apparatus for welding electromechanical machine cores as set forth in claim 3, wherein each of said welding arbors is configured having a machine readable indicia.

5. Apparatus for welding electromechanical machine cores as set forth in claim 4, wherein said machine readable indicia is configured as at least one slot defined on a base plate of said welding arbor.

6. Apparatus for welding electromechanical machine cores as set forth in claim 1, wherein said welding arbors are radially expandable to concentrically align said lamination stack.

7. Apparatus for welding electromechanical machine cores as set forth in claim 6, wherein said conveyor assembly includes a loading station having a mechanism to effect expansion of said welding arbor.

8. Apparatus for welding electromechanical machine cores as set forth in claim 7, wherein said welding device includes a mechanism to effect expansion of said welding arbor.

9. Apparatus for welding electromechanical machine cores as set forth in claim 1, wherein said conveyor assembly is configured as a loop about which said welding arbors travel.

10. Apparatus for welding electromechanical machine cores as set forth in claim 1, wherein said welding device comprises a ram mechanism to engage said lamination stack during welding thereof.

11. Apparatus for welding electromechanical machine cores as set forth in claim 10, wherein said ram mechanism is operative to apply a first higher compression pressure and a second lower welding pressure against said lamination stack.

12. Apparatus for welding electromechanical machine cores as set forth in claim 1, wherein said welding device includes at least one welding head driven by a servo-controlled mechanism to effect at least one axial weld along said lamination stack.

13. Apparatus for welding electromechanical machine cores as set forth in claim 1, wherein said welding device includes at least one welding head operative to angularly index about said lamination stack to produce welds at a plurality of angular locations.

14. Apparatus for welding electromechanical machine cores as set forth in claim 13, wherein said welding device includes at least three of said welding heads.

15. An apparatus for welding a lamination stack located on a support structure, said apparatus comprising:
- a ram mechanism to engage said lamination stack during welding thereof;
- means for controlling said ram mechanism so as to initially apply a first higher compression pressure and to subsequently apply a second lower welding pressure against said lamination stack; and
- at least one welding head driven to effect at least one axial weld along said lamination stack while said lamination stack is maintained at said lower welding pressure.

16. Apparatus for welding a lamination stack as set forth in claim 15, wherein said at least one welding head is further operative to angularly index about said lamination stack to produce axial welds at a plurality of angular locations.

17. Apparatus for welding a lamination stack as set forth in claim 16, wherein said welding device includes at least three of said welding heads.

18. Apparatus for welding a lamination stack as set forth in claim 15, including a servo-controlled mechanism operative to drive said at least one welding head in an axial direction.

19. An apparatus for welding a lamination stack located on a support structure, said apparatus comprising:
- a ram mechanism to engage said lamination stack during welding thereof;
- at least one welding head mounted for vertical movement adjacent to said lamination stack and producing an axial weld along said lamination stack;
- said at least one welding head being further mounted to angularly index about said lamination stack to produce a plurality of said axial welds at respective angular locations; and
- means for controlling vertical and angular movement of said at least one welding head to produce said plurality of axial welds.

20. Apparatus for welding a lamination stack as set forth in claim 19, wherein said welding device includes at least three of said welding heads.

21. Apparatus for welding a lamination stack as set forth in claim 20, including a servo-controlled mechanism operative to drive said at least one welding head in a vertical direction.

22. Apparatus for assembling a stack of laminations into an electromechanical machine core, comprising:
- a plurality of arbors adapted to support a stack of core laminations;
- a storage structure defining a plurality of arbor storage locations at which respective of said arbors are maintained, said storage structure being configured as a vertical rack with a predetermined number of said arbor storage locations being situated one above another;
- a transporter device operative to individually move said arbors to and from a respective of said arbor storage locations;
- a core assembly device operative to connect the stack of core laminations together; and
- a conveyor assembly for moving said arbors between said core assembly station and said transporter device.

23. Apparatus for assembling a stack of laminations into an electromechanical machine core as set forth in claim 22, wherein said core assembly device is a welding device.

* * * * *